United States Patent [19]

Ishii et al.

[11] Patent Number: 5,101,391
[45] Date of Patent: Mar. 31, 1992

[54] METHOD FOR SETTING THE LOOP GAIN IN A TRACKING SERVO LOOP

[75] Inventors: Hidehiro Ishii; Noriyoshi Takeya; Chiharu Miura; Tatsuya Fukuda, all of Saitama, Japan

[73] Assignee: Pioneer Electronic Corporation, Tokyo, Japan

[21] Appl. No.: 414,510

[22] Filed: Sep. 29, 1989

[30] Foreign Application Priority Data

Mar. 20, 1989 [JP] Japan .................................. 1-69020

[51] Int. Cl.[5] .............................................. G11B 7/095
[52] U.S. Cl. ............................. 369/44.29; 369/44.34; 369/58
[58] Field of Search ............... 369/44.29, 44.34, 44.35, 369/44.36, 54, 58

[56] References Cited

U.S. PATENT DOCUMENTS

| | | | |
|---|---|---|---|
| 4,310,912 | 1/1982 | Kikuchi et al. | 369/44.36 X |
| 4,587,644 | 5/1986 | Fujiie | 369/54 X |
| 4,589,103 | 5/1986 | Tajima | 369/44.32 |
| 4,700,334 | 10/1987 | Shinkai | 369/44.29 X |
| 4,701,603 | 10/1987 | Dakin et al. | 369/44.29 X |
| 4,878,211 | 10/1989 | Suzuki et al. | 369/54 X |
| 4,942,564 | 7/1990 | Hofer et al. | 369/54 X |
| 5,005,163 | 4/1991 | Yamamoto et al. | 369/44.36 |

Primary Examiner—Roy N. Envall, Jr.
Assistant Examiner—W. R. Young
Attorney, Agent, or Firm—Sughrue, Mion, Zinn, Macpeak & Seas

[57] ABSTRACT

A method of setting the loop gain of a tracking servo loop of a disc player. The optimum loop gain is set for each playing of a disc without being influenced by disc eccentricity. The servo loop is opened, the disc is driven at a revolving speed which is lower than that of normal playback at the current position of the information reading spot, and a tracking error signal is obtained. The loop gain is set on the basis of a plurality of the sample values.

4 Claims, 6 Drawing Sheets

SW ON

METHOD FOR SETTING THE LOOP GAIN IN A TRACKING SERVO LOOP

BACKGROUND OF THE INVENTION

The present invention relates to methods for setting the loop gain in a servo loop of a tracking servo device of an optical disc player.

What is essential for an optical disc player for playing an information storage disc (referred to as disc, hereinafter) such as a video disc, a digital audio disc and the like, is a tracking servo loop for controlling a laser light spot, which serves as an information reading spot of a pick-up, to make it precisely track a storage track irrespective of any eccentricity of the disc and the like. Some known examples of tracking servo-loops operate according to the so-called 3-beam method, in which there is provided an information reading main beam and two tracking error detecting auxiliary beams. The auxiliary beams are arranged on both sides of the main beam such that the line on which the three beams fall is placed at a predetermined offset angle with a tangent line of a track. An error signal is generated on the basis of the difference between the luminous quantities of the two auxiliary beams reflected from the information storage surface of a disc.

In such a tracking servo loop, it sometimes occurs thay the loop gain varies from disc to disc due to a variation in the reflectivity of a disc being played. The fluctuation in loop gain leads to a decline in tracking performance with respect to focusing error, which will not provide stabilized servo operation.

For this reason, it has been traditional to set the loop gain for each disc by detecting the peak-to-peak values (differences between positive and negative wave heights) fo a tracking error signal, which are generated when the tracking loop is open and the disc is stationary, and by setting the loop gain accordingly.

However, if the disc being played has any eccentricity, several problems result with the above method. At stationary or nearly stationary revolving speeds, eccentricity of a disc will cause the relative speed of the laser light spot in crossing a track to increase, causing the frequency of the tracking error signal to rise. Additionally, because a low pass filter (LPF) circuit is placed before the input of an A-D converter (for converting the error signal into digital data) to attenuate undesirable frequency components such as noise, the wave height of the tracking error signal drops as shonw in FIG. 7(A). It thus becomes impossible to detect precisely the peak-to-peak values of the tracking error signal, and consequently precise loop-again setting becomes impossible.

SUMMARY OF THE INVENTION

It is an object of the present invention to provide a method for setting the loop gain in a tracking servo loop after which an optimum loop gain can be set for each disc to be played without the influence of any disc eccentricity.

The method for setting the loop gain in a tracking servo loop according to the present invention is characterized by; generating a tracking error signal under the conditions of an open servo loop and a disc being rotated at a lower revolving speed than the normal playback speed for the current position of the information reading spot, obtaining a plurality of sample values of said error signal, and setting the loop gain accordingly.

DETAILED DESCRIPTION OF THE PREFERRED EMBODIMENTS

Figure 1:
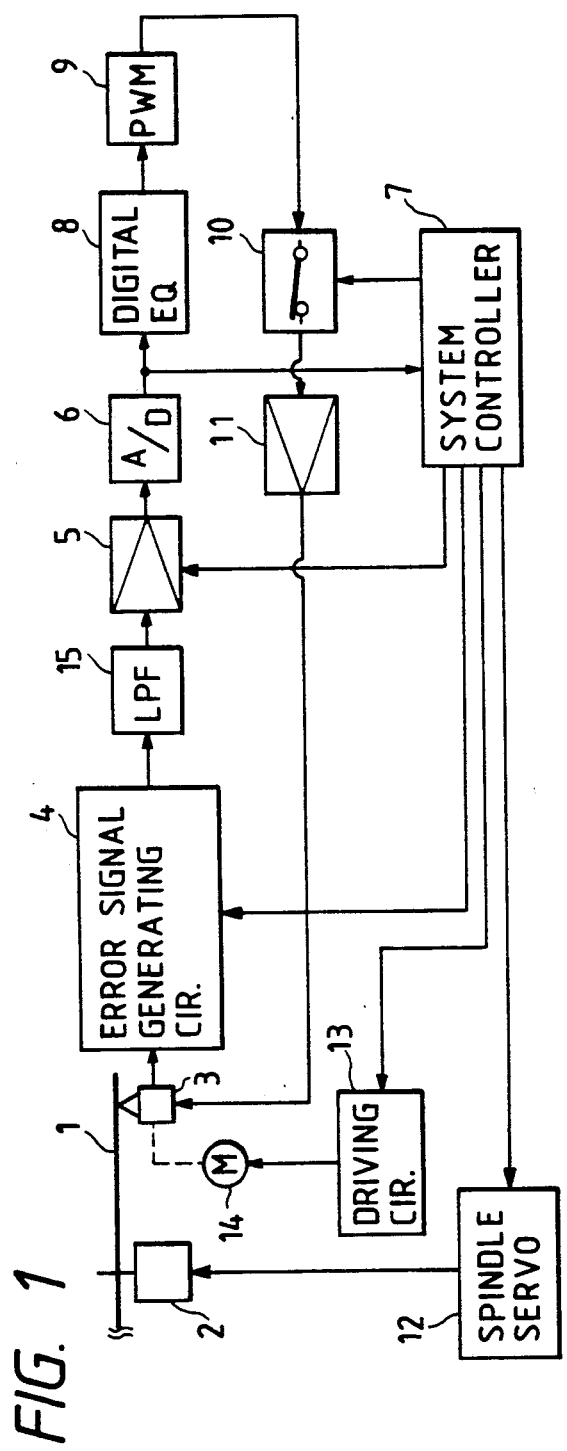
FIG. 1 is a block diagram showing an embodiment of a tracking servo to which the methods for setting the loop gain according to the present invention are applied.

FIG. 1 is a block diagram showing an embodiment of a tracking servo to which the methods for setting the loop gain according to the present invention are applied. In FIG. 1 a spindle motor 2 drives and rotates a disc 1, whose stored information is read out by a photo pick-up 3. The photo pick-up 3 consists of an optical system including a laser light source and an objective lens, a focus actuator, a tracking actuator, a photo detector, and the like and is mounted in a carriage (not shown) which is fully movable along a radius of the disc. The output of the photo detector within the photo pick-up 3 is supplied to a tracking error signal generating circuit 4, which generates a tracking error signal in accordance with, for example, the well-known 3-beam method mentioned above.

The tracking error signal from the tracking error signal generating circuit 4 goes through a LPF circuit 15 for attenuating undesirable frequency components higher than the sampling frequency of A-D conversion and a voltage controlled amplifier (VCA) 5 to be supplied to an A-D (analog to digital) converter 6. The A-D converter 6 samples the tracking error signal with a sampling pulse to produce digital data according to its sampled data. The output data from the A-D converter is delivered to a system controller 7 and a digital equalizer (EQ) 8. The digital equalizer 8 compensates the phase and gain of the digitized tracking error signal.

The phase-compensated digitized tracking error signal is supplied to a pulse width modulator (PWM) circuit 9. The PWM circuit 9 generates a pulse signal with a pulse width dependent on the level of the tracking error signal by means of a timing pulse synchronized with the sampling pulse. The output from the PWM circuit 9 goes through a loop switch 10 and a driving amplifier 11 to become a driving signal to the tracking actuator within the photo pick-up 3.

When the loop switch 10 is closed, thereby closing the tracking servo loop described above, the tracking actuator is driven in accordance with the signal level in the tracking error signal to cause the laser light spot to track precisely a storage track of the disc 1.

Figure 2:
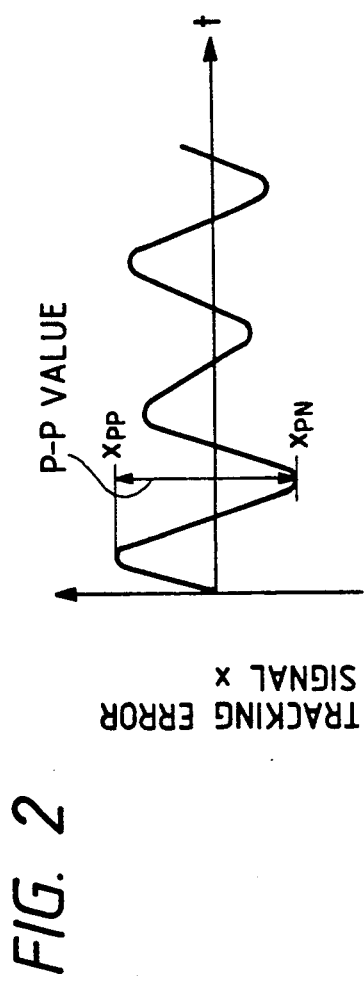
FIG. 2 is a waveform chart showing a change in the waveform of a tracking error signal when the servo loop is open.

A system controller 7, which comprises, for example, a microprocessor, performs the controls necessary for disc-loading and disc-clamping by known mechanisms (not shown), for driving control of a carriage motor 14 via a driving circuit 13, and the like. Additionally, during the start up of the system, the processor 7 determines and sets an appropriate loop-gain as described below, on the basis of the digitized tracking error signal generated during an open loop state of the tracking servo loop. When the loop is open, the tracking error signal, having passed through LPF circuit 15, changes together with the disc rotation as shown in FIG. 2.

Figure 3:
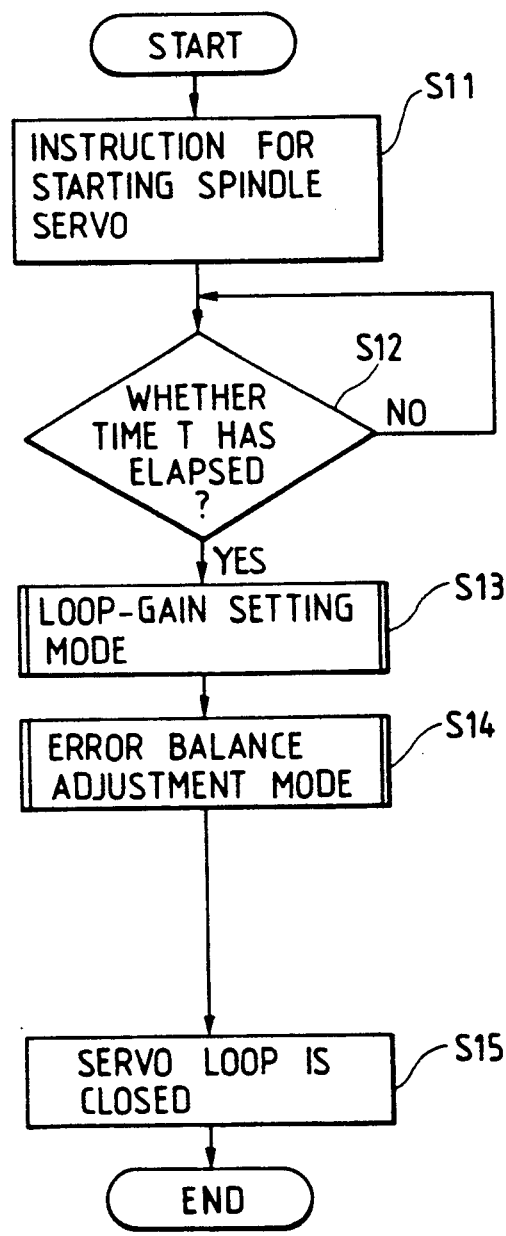
FIG. 3 is a flowchart showing a preferred embodiment of the present invention for setting the loop gain of a tracking servo loop.

FIG. 3 is a flowchart of the process for setting the loop gain according to the present invention, and which is executed by the processor of system controller 7. The process of setting the loop gain should not begin until a disc is loaded and clamped, the pick-up 3 is moved to the innermost track, a focusing servo is operated, and the setting of the gain thereof has been completed. The process for setting the tracking loop gain is executed in a open loop state where the loop switch 10 is off.

Upon completion of the process of setting the gain of the focusing servo, the processor 7 at step (S11) sends an instruction signal for starting the spindle servo to a spindle servo circuit 12. At step (S12) it is determined whether a time T (e.g., 100 ms) has elapsed since the time of the above-mentioned instruction signal.

The time T corresponds to the time needed for the spindle motor 2 to reach a predetermined revolving speed (e.g., 100 rpm) in the course of the spindle motor's attaining a predetermined revolving speed (e.g., 580 rpm) for playing the innermost tracks on a disc.

When the predetermined time T elapses or the revolving speed of a disc becomes about 100 rpm, the tracking error data is sampled by the processor and in steps (S13) and (S14), the processor executes a loop-gain setting mode and an error signal positive-and-negative balance adjustment mode on the basis of the sampled error data. Then, at step (S15), the loop switch 10 is closed to close the servo loop, terminating a series of processes for setting the loop-gain setting.

Figure 4:
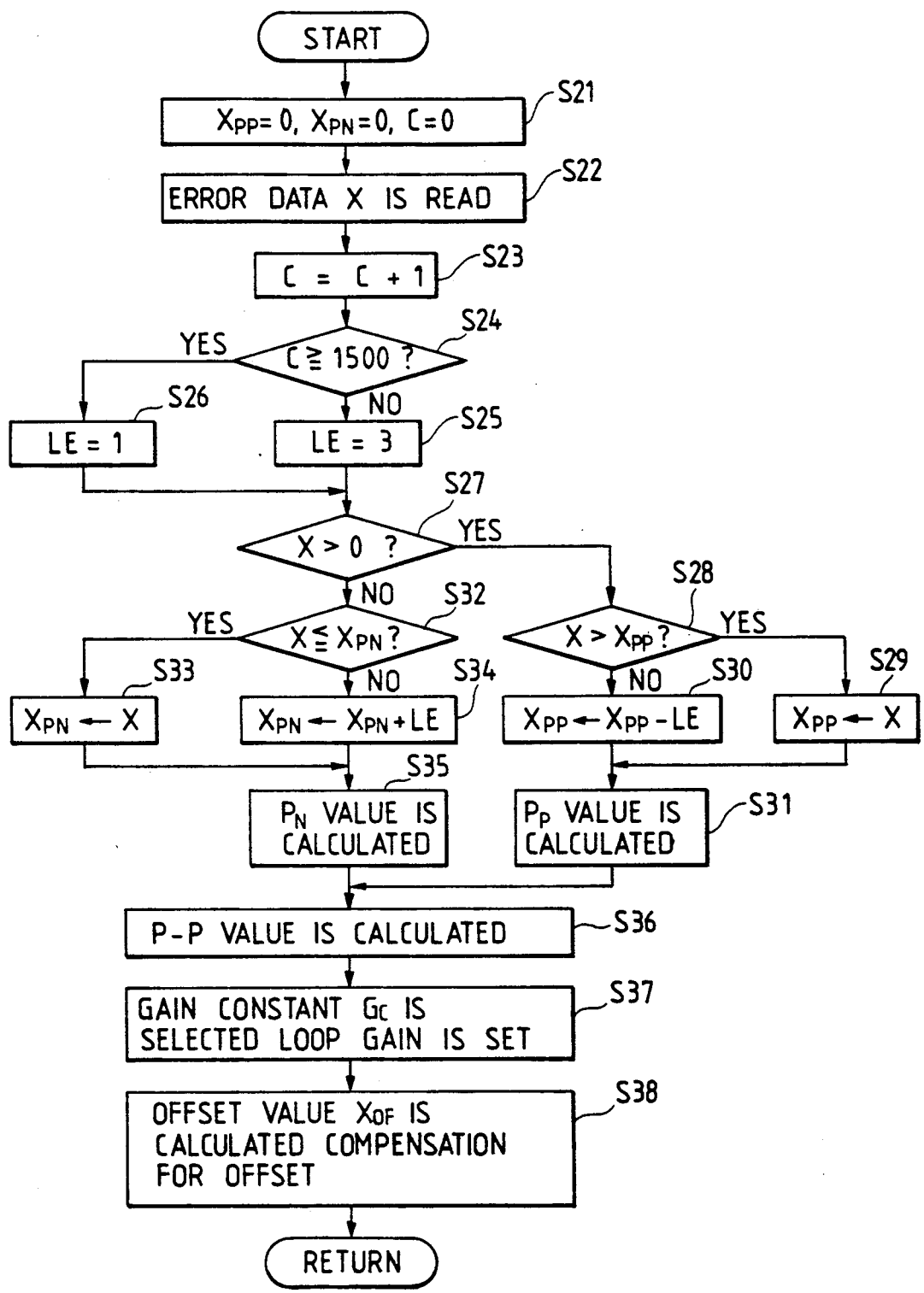
FIG. 4 is a flowchart showing a processing procedure of each mode of adjusting the balance between positive and negative in a tracking error signal and setting the loop gain.

The processing steps for the above-mentioned loop-gain setting mode and the error signal positive-and-negative balance adjustment setting mode are shown in the flowchart of FIG. 4. In the process, it is assumed that tracking error data is read for a predetermined number of tracks of data during the time needed for at least one revolution of the play-time revolving speed at the innermost part of a disc.

The processor first (S21) resets to zero the internal registers storing peak values Xpp and Xpn and resets to zero a synchronous counter which counts up in synchronism with sampling periods. The count value is C. At step (S22), the processor reads tracking error data X. At step (S23) the counted value C is incremented by 1 and at step (S24) a judgment is made whether count value C is equal to or greater than a predetermined standard count value, for example, 1500. If the count C is not equal to or greater than 1500, a constant value LE is set to the value "3" in step (S25). Otherwise, step (S26) sets LE=1.

The constant LE is a value set as a countermeasure against noise in the peak hold of the error signal. In the first predetermined period of a sampling and hold period (the predetermined period and a sampling frequency determine the foregoing standard counted value), the setting LE=3 improves the tracking performance of detected peak values Xpp and Xpn with respect to a change in peaks of the error signal; and thereafter, the setting LE=1 reduces to enhance the holding characteristics.

Figure 8:
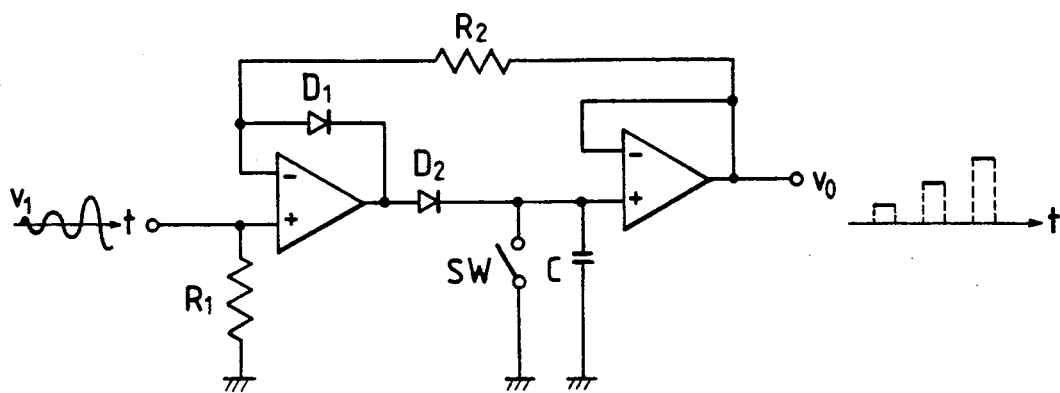
FIG. 8 is a peak hold circuit.
Figure 9:
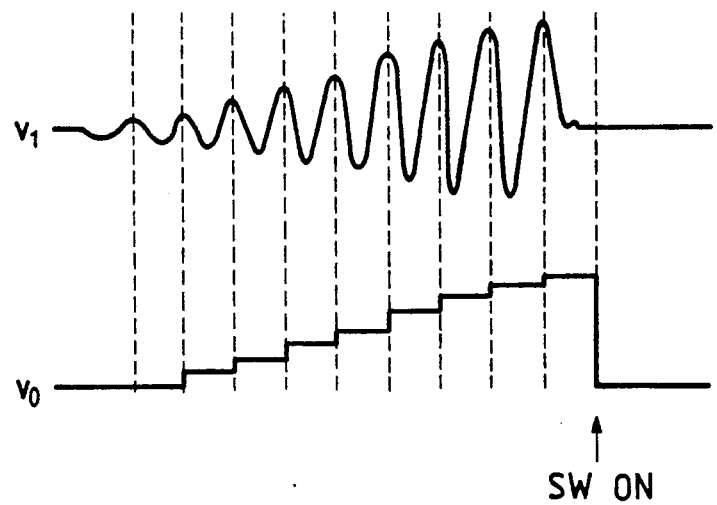
FIG. 9 are waveforms showing operation of the peak hold circuit.

FIG. 8 shows a peak value hold circuit and FIG. 9 shows an input voltage v1 and an output voltage v0 of the peak value hold circuit. The input voltage v1 is, for example, frequency 10 KHz and when the amplitude of the input voltage becomes 3 V from 0 V, a switch turns on to reset the circuit so that the output waveform of the peak value hold circuit is as shown by v0. In case of a real tracking error signal, the peak value may be erroneously detected due to the influence of noise, etc., at the start of the disc rotation. Accordingly, at the rise of the tracking error signal (when the counted value C is less than, for example, 1500), the time constant of detecting the peak value in, for example, Xpp (upper peak value) detection, is made high by setting the constant LE at 3 (the time constant is changed by a switch etc. correspondingly to LE) so that the property of tracing the change of the signal becomes good and further it is corrected to hold the maximum value due to a noise by subtracting the constant LE from the detected peak value Xpp (Xpp-LE).

On the other hand, when the error signal becomes stable (counted value C is larger than, for example, 1500), the constant LE is set at 1 so that the time constant of detecting the peak value is made low, and the corrected value LE also becomes low. That is, the constant "LE" determines the time constant of the peak hold circuit and the corrected value.

Subsequently, at step (S27), judgment is made as to whether the most recently read sample of error data X is positive. If X>0, the data X is further judged at step (S28) to see if it is larger than the currently stored peak value Xpp. If X>Xpp, the most recently read sample X is stored at step (S29) as the detected peak value. If X≦Xpp, the currently stored peak value Xpp minus the constant LE is stored a a detected peak value Xpp at step (S30). Thereafter, at step (S31), a positive peak value Pp is calculated from the detected peak value Xpp.

On the other hand, if the judgment in step (S27) is that X≦0, it is judged in step (S32) whether the error data sample X is equal to or less than the currently stored peak value Xpn. If X≦Xpn, the error data sample X is stored at step (S33) as the detected peak value Xpn. If X>Xpn, the currently stored peak value Xpn plus the constant LE is stored at step (S34) as the detected peak value. At step (S35) a negative peak value Pn is calculated from the stored peak value Xpn. In step (S36) a peak-to-peak value is calculated on the basis of an expression Pp−Pn.

Figure 6:
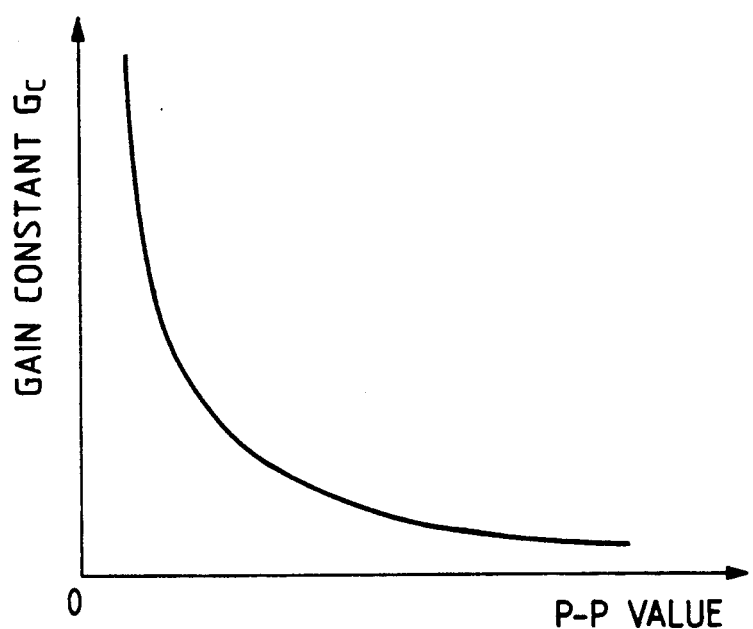
FIG. 6 is a characteristic curve showing the relationship between detected peak-to-peak values and a gain constant GC.
Figure 7A:
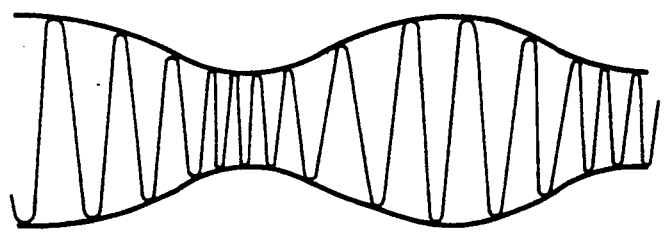
FIGS. 7(A) and 7(B) are waveform charts showing a change in the waveform of a tracking error signal generated when the revolving speed of a disc is of a stationary number (A) and of a small number (B), respectively.
Figure 7B:
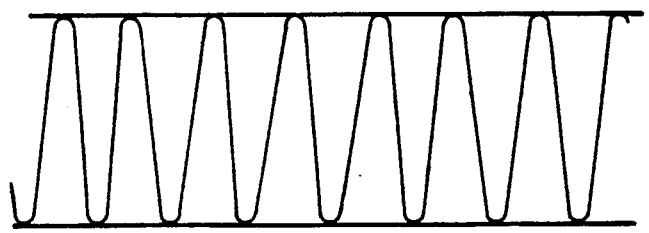

Subsequently, a gain constant Gc corresponding to the peak-to-peak value is selected from a gain constant table. The gain constant table is based on the characteristic of FIG. 6 showing the relationship between peak-to-peak value and gain constant Gc and is stored in a ROM in the controller 7. In order to make the loop gain correspond to this gain constant Gc, in step (S37) the VCA 5 is controlled. Subsequently, an offset value Xof is calculated on the basis of an expression (Pp−Pn)/2, and at step (S38) the error signal is compensated for offset worth by, for example, subtracting the offset value Xof from the error signal level to maintain the positive-and-negative balance value of the error signal.

In FIG. 1, the tracking error signal after LPF 15 is normally set at 2 Vp−p and multiplied by, for example, 2 through VCA 5 so that 4 Vp−p is inputted into A/D converter 6. The tracking error level is varied by the eccentricity of a disc or variation in reflectivity of the disc. When the tracking error signal is 1.5 Vp−p, in order to input 4 Vp−p to the A/D converter, it is necessary to multiply the signal by 4/1.5 (2.66 ...). However, since the number of steps of varying the VCA 5 is dependent on the internal operation precision, the optimum Gc (2.7 times in this case) is selected in accordance with the relation between the gain constant and the error level shown in FIG. 6.

In FIG. 4, the upper peak value Pp and the lower peak value Pn of the tracking error signal are calculated at steps S31 and S35. The upper and the lower values are calculated with respect to a center value X=0. However, a center value for p−p value (Pp−Pn) is not 0 (X≠0). The offset Xof is defined by Xof=(Pp−Pn)/2. For example, when Pp=1.3 V and Pn=1.7 V, then p−p=3 V and XOf=(1.3−1.7)/2=−0.2 V. The system controller 7 sends an instruction of shifting the center value by the offset value −0.2 V to the error signal generating circuit 4.

When the servo loop is open and the disc is rotated at a speed (e.g., 100 rpm) lower than that normally required for the innermost track part, a plurality of peak-to-peak values, representing the magnitudes of the amplitudes of the tracking error signal, are obtained, and the loop gain is set on the basis of a plurality of these values. This makes it possible to automatically set the optimum loop gain for each playing of a disc, irrespective of eccentricity of the disc. This is because the low revolving speed of the disc prevents a change in the relative speed at which the information reading spot crosses the storage track. It should be noted that the peak-to-peak value of the tracking error signal is calculated throughout the time needed for at least one revolution of said disc rotating at the speed lower than the normal speed. This makes it possible to obtain at least one revolution worth of peak-to-peak values of the tracking error signal, on the basis of the maximum value of which the loop gain is set, so that it is possible to avoid the influence of the eccentricity in the disc.

Moreover, in the above-mentioned embodiment it is not until the revolving speed of the disc 1 reaches 100 rpm that the loop gain is set. However, it is also possible to have a procedure for executing loop-gain setting before starting the spindle servo.

Figure 5:
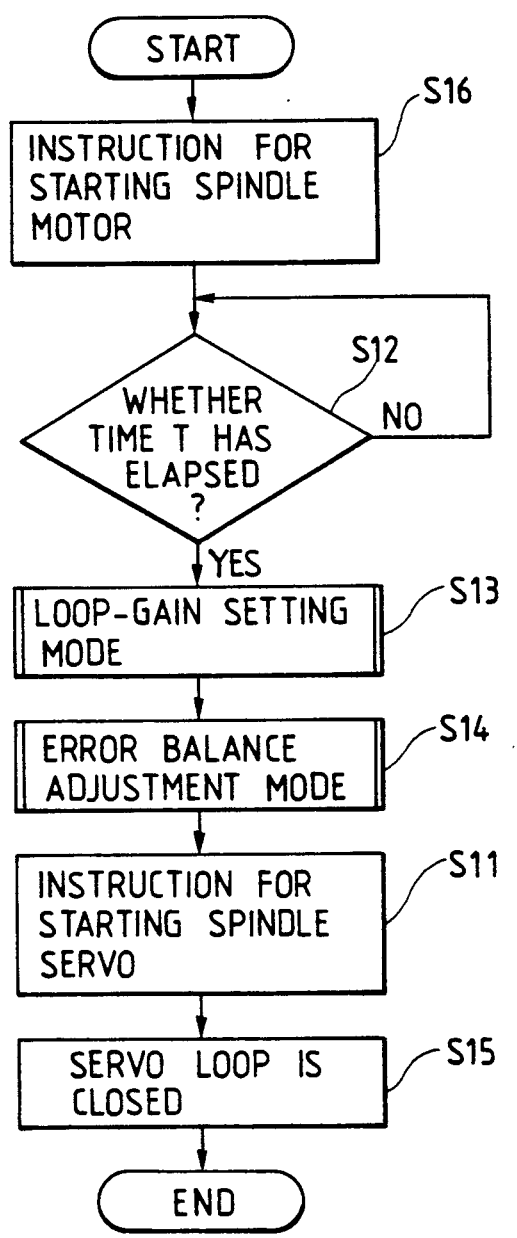
FIG. 5 is a flowchart showing another embodiment of the present invention for setting the loop gain of a tracking servo loop.

The processing procedure in such case will be described with reference to the flowchart of FIG. 5. In FIG. 5, steps denoted with the same numerals as in FIG. 3 provide the same processes. As in the case of FIG. 3, it is assumed that the process of setting the loop-gain does not begin until after loading and clamping the disc and moving the carriage supporting the pick-up to the innermost track, and after the focusing servo is set. The process for setting the loop gain is executed with the loop open, i.e., the loop switch 10 is open.

In this case the spindle motor is rotated at the desired speed needed for calculating the gain Gc by kicking the spindle motor with a pulse of predetermined height and width, and the spindle servo is not actuated until after the loop gain is set. After the gain is set for the focusing servo, the processor sends an instruction signal at step (S16) to the spindle circuit 12 to cause the circuit 12 to generate a forward-rotation driving pulse with a pulse height and width necessary for driving and rotating a spindle motor 2 at about 100 rpm. In step (S12), after checking the elapse of predetermined time T necessary for the revolving speed of the spindle motor 2 to come up to 100 rpm, the processor executes at steps (S13) and (S14) a loop-gain setting mode and a positive-and-negative balance adjustment mode. At step (S11) the processor sends an intruction signal for starting the spindle servo to the spindle servo circuit 12, and then, at step (S15), turns on the loop switch 10 of the tracking servo loop to close the servo loop, thereby terminating the series of steps for setting the loop gain.

In the above-mentioned embodiment, the spindle motor is kicked in such a way that it is before the adjustment of a loop gain that the revolving speed of a disc 1 has come up to the desired extent for the adjustment, whereas after having made the revolving speed of the disc 1 constant within the period of the adjustment and completing the adjustment, the spindle servo circuit is operated.

What is claimed is:

1. In a disc player of the type having a tracking servo loop for accurately positioning an optical pick up with respect to tracks on the disc, said servo loop having a loop gain which can be set; said disc player further having a controller for controlling the processing steps executed in the player; a method for setting the gain of said servo loop, comprising:

opening said servo loop;

rotating said disc at a speed lower than the normal playback speed of said disc for the current position of the optical pick up;

generating a tracking error signal during said lower speed rotation of said disk;

sampling the magnitude of said tracking error signal; and setting the loop gain on the basis of a plurality of said sample values.

2. A method according to claim 1, wherein the loop gain is set on the basis of a maximum value of a plurality of said sample values.

3. A method according to claim 1, wherein said sample values are taken in for a time required for at least one revolution of said disc rotating at the speed lower than the normal playback speed.

4. A method according to claim 1, wherein the step of rotating comprises rotating said disc only for a predetermined time.

* * * * *